UNITED STATES PATENT OFFICE 2,506,351

2(META - AMINOBENZENESULFONAMIDO)5-HALOPYRIMIDINES AND METHOD OF PREPARING SAME

Jackson P. English, Stamford, and Joe H. Clark, Greenwich, Conn., assignors to American Cyanamid Company, New York, N. Y., a corporation of Maine No Drawing. Application February 14, 1945, Serial No. 577,946

7 Claims. (Cl. 260—251)

This invention relates to new organic compounds, which have been found to have surprising therapeutic effects, and to methods of preparing these new products.

During the past few years many para-aminobenzene sulfonamides have been prepared and described. Some of these sulfanilamides, notably sulfadiazine, sulfaguanidine, sulfathiazole, and others, have been found to possess marked bacteriostatic and bacteriocidal properties. Although a few meta-aminobenzene sulfonamides have been prepared, tested, and found to possess slight therapeutic activity, it is generally agreed that those known sulfonamides which have an amino group in the meta position on the benzene ring have little, if any, activity against bacteria, and are of little value in the treatment of infectious diseases.

Although several known sulfanilamides are highly efficacious against gram-positive bacteria, they appear to be of no significant value in the treatment of malaria, sleeping sickness, filariasis, and other diseases caused by an infestation of the blood stream by protozoa. This applies with respect to both para- and meta-aminobenzene sulfonamides of previously known constitution. Some control of malaria, a disease caused by protozoans of the genus Plasmodium, has been attained by the use of quinine or complex substances of synthetic origin, but these drugs are difficult to obtain or manufacture, are expensive, and are not as effective as could be desired. Also, there is no known drug which is prophylactic with respect to malaria organisms.

Despite the previously known therapeutic behavior of sulfonamides we have discovered that certain meta-aminobenzenesulfonamidodiazines can be prepared and these compounds are surprisingly effective, both as prophylactic and curative agents, against protozoal organisms of the type which cause avian malaria.

The compounds of the present invention which possess these unusual properties may be represented by the formula

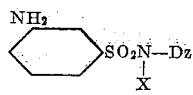

in which X represents hydrogen, a cationic salt-forming radical or an alkyl radical, and Dz represents a diazine radical, substituted or unsubstituted.

The nitrogen atom of the free meta-amino radical may be substituted with substituents other than hydrogen since it has been found that such derivatives can be converted in the body into those having a free amino group. These derivatives, also being new and useful compounds, are included within the scope of the present invention. Among such derivatives are those meta-substituted-benzenesulfonamidodiazines in which the meta substituent is a nitro, azo, azido, imido radical or a substituted amino radical such as acylamino, alkylamino, arylamino, azomethine, including mono-aldoseamino, ureido, or the like.

As will be seen, the meta-substituent in the above formula may be represented by the symbol R which includes the radical —NH$_2$ and any radical convertible into an amino radical such as —NO$_2$, —N=N—,

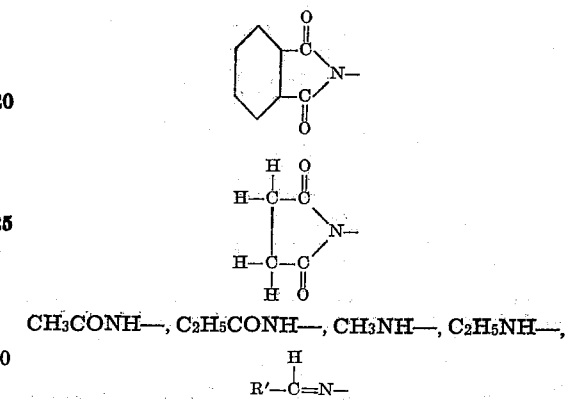

CH$_3$CONH—, C$_2$H$_5$CONH—, CH$_3$NH—, C$_2$H$_5$NH—, $$R'-\overset{H}{\underset{}{C}}=N-$$

in which R' is one of the groups CH$_3$—, C$_2$H$_5$—, HOCH$_2$(CHOH)$_4$—, etc.,

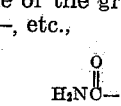

N$_3$—, and others. Preparation of representative compounds of this type will be shown in the specific examples which follow.

A preferred method of preparing compounds of the present invention is to react a meta-nitro benzene sulfonyl halide with an amino diazine in the presence of a tertiary amine. If desired, the reaction may be conducted in the presence of a non-hydroxylated, inert solvent such as benzene, ether, chloroform, dioxane, or the like. The reaction may be caused to take place at any temperature from about 0° C. to 120° C., or higher. The time required to bring about coupling of the sulfonyl halide and the amino diazine will depend upon the temperature of the reaction, and may be from about fifteen minutes to seventy-two hours, the lower temperatures requiring, of course, longer reaction times. The meta-nitro group of the resulting product is then reduced by methods known to those skilled in the art to obtain the desired meta-aminobenzenesulfonamidodiazine.

The necessity of reducing the nitro group may be avoided by starting with meta-aminobenzenesulfonyl fluoride and reacting this compound with any desired aminodiazine. This reaction gives the meta-aminobenzenesulfonamidodiazine directly.

Another analogous method involves the reaction of a meta-acylaminobenzenesulfonyl halide with a desired aminodiazine. The acylamino group of the resulting product is then hydrolyzed to an amino group. These reactions are illustrated in Examples 36 and 37.

Another distinct method of preparing the compounds of the present invention comprises reacting a meta-aminobenzenesulfonamide with any 2-halodiazine. This reaction is carried out in the presence of a moderately strong, inorganic base, such as potassium carbonate, sodium carbonate or calcium carbonate or other inorganic, alkaline substance free from hydroxyl groups with the reactants dissolved in a high-boiling, non-reactive solvent such as nitro-benzene, kerosene, polychlorobenzene, or the like, at 160–180° C. This is also illustrated in the specific examples; for instance, Example 26. Of course, meta-nitro- or meta-acylaminobenzenesulfonamides may be used instead of the meta-amino compound but the resulting product must be reduced or hydrolyzed, as the case may be, to obtain the desired meta-amino compound.

A still further method of preparing the compounds of the present invention comprises the steps of reacting a meta-nitrosulphenyl halide with an aminodiazine at relatively low temperatures (5°–35° C.), followed by oxidation of the sulfur group with, for example, potassium permanganate at room temperature or chromic acid anhydride in glacial acetic acid at temperatures around 90° C. The resulting meta-nitrosulfonamide is then treated with reducing agents to reduce the meta-nitro group to a meta-amino radical.

As will be apparent from what has been said and from the specific examples which follow, many different types and kinds of metanilyldiazines may be prepared. The diazine group may be that of a pyrimidine, pyridazine, or pyrazine. The diazine ring may be free from substituents, other than those forming the sulfonamido group, or it may be substituted at any one or more of the remaining three possible places with one or more alkyl, alkoxy, alkoxyalkyl, carbalkoxy, carboxy, alkaryl, aryl, amino, nitro, halogen, or like radicals. In some cases, as when using 2-aminoquinoxaline (Example 34) as the diazine intermediate, the substituents may form a closed ring on the diazine nucleus. Some of these substituents may be added to the diazine ring after formation of the sulfonamidodiazine as in Example 43. This is particularly advantageous where the substituent would interfere with the coupling of the intermediates. Similarly, a benzenesulfonyl halide may be coupled with a suitable diazine and the product nitrated to yield metanitrobenzenesulfonamidodiazine after which the nitro group may be reduced to an amino group. This procedure is shown in Example 44.

A still further modification comprises the steps of preparing metanilylguanidine and converting this compound to 2-metanilamido-4,6-dimethylpyrimidine by heating with acetylacetone. Other compounds may be prepared by reacting metanilylguanidine with other 1,3-diketones, diesters, or keto-esters.

As the hydrogen of the sulfonamido group is acidic in character, it may be replaced with cationic salt-forming radicals by direct reaction with alkali-metal hydroxides or alkoxides. These salts may be recovered and used as such if desired. Salts of heavy metals such as copper, iron, aluminum, arsenic, chromium and the like may be obtained by reacting an aqueous solution of an alkali metal salt with a solution of the desired heavy metal salt. Salts of strong, high boiling amines, such as morpholine, phenylpropylamine and the like may also be prepared. The acidic hydrogen may also be replaced by alkyl radicals such as methyl, ethyl, propyl, or the like, by reaction with a diazoalkane, such as diazomethane, diazopropane, or the like, as illustrated in Example 45.

The invention will now be described in greater detail by means of the following specific examples which set forth the preparation of representative compounds of the present invention by several of the different methods discussed above. It will be understood, of course, that these examples are intended to illustrate specific aspects of the invention and are not intended to limit it to the particular reactants or reaction conditions described. All parts are by weight unless otherwise indicated.

EXAMPLE 1

2-(m-nitrobenzenesulfonamido)pyrimidine

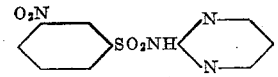

22 parts of m-nitrobenzenesulfonyl chloride and 14 parts of 2-aminopyrimidine were mixed with 25 parts of anhydrous pyridine and the reaction mixture was heated for 10 minutes on the steam bath, and after 30 minutes standing was poured into 700 parts of water. The 2-(m-nitrobenzenesulfonamido) pyrimidine was filtered off and dried. The product may be purified by solution in alkali, treatment with charcoal, filtration, and reprecipitation with acid. 19 parts melting at 217°–219° C. were obtained.

EXAMPLE 2

2-metanilamidopyrimidine

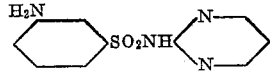

45 parts of 2-(m-nitrobenzenesulfonamido)-pyrimidine from Example 1 were dissolved in 250 parts of 1:1 aqueous ammonia. The mixture was then saturated with hydrogen sulfide with cooling. The resulting solution was then boiled until a solid separated. It was then acidified with acetic acid and the precipitate was collected. The precipitated 2-metanilamidopyrimidine was purified by solution in alkali, filtration, treatment with charcoal, and precipitation with acid. 37 parts melting at 252°–253° C. (block) were obtained.

EXAMPLE 3

2-($N^3$-acetylmetanilamido)pyrimidine

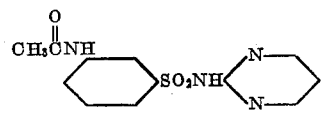

A suspension of 5 parts of 2-metanilamidopyrimidine as prepared in Example 2 was suspended in 15 parts of acetic anhydride and refluxed for 45 minutes. The mixture was cooled and the solid was filtered. The 2-(N³-acetylmetanilamido)pyrimidine was purified by extraction with hydrochloric acid followed by solution in ammonia and reprecipitation with acid. It melted at 242°–243° C. (block).

EXAMPLE 4

*2-(m-nitrobenzenesulfonamido)-5-chloropyrimidine*

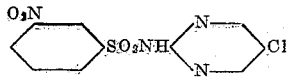

22 parts of m-nitrobenzenesulfonyl chloride and 12 parts of 2-amino-5-chloropyrimidine (prepared by the chlorination of aminopyrimidine in acid solution) were mixed with 70 parts of pyridine and refluxed for two hours. This solution was poured into 400 parts of water containing 75 parts of hydrochloric acid. The separated solid was filtered. The 2-(m-nitrobenzenesulfonamido)-5-chloropyrimidine was purified by solution in alkali, filtration, and reprecipitation with acid after treatment with charcoal. The product melted at 234°–237° C.

EXAMPLE 5

*2-metanilamido-5-chloropyrimidine*

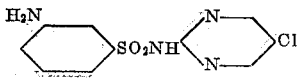

A suspension of 17 parts of the nitro compound prepared in Example 4 was suspended in 90 parts of 1:1 ammonium hydroxide. The suspension was saturated with hydrogen sulfide and boiled until a solid separated. The mixture was cooled, acidified with acetic acid, and filtered. The 2-metanilamido-5-chloropyrimidine was purified by solution in alkali, filtration, and precipitation with acid after treatment with charcoal. 12 parts, melting at 228°–230° C., were obtained.

EXAMPLE 6

*2-(N³-acetylmetanilamido)-5-chloropyrimidine*

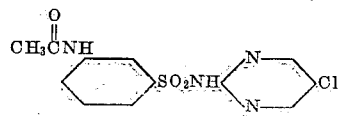

Five parts of 2-metanilamido-5-chloropyrimidine, as prepared in Example 5, were suspended in 15 parts of acetic anhydride and refluxed for one hour. The cooled suspension was filtered and washed. The 2-(N³-acetylmetanilamido)-5-chloropyrimidine was purified by extraction with acid followed by solution in alkali and reprecipitation after filtration. The melting point of the product was 256°–258° C.

EXAMPLE 7

*2-(m-nitrobenzenesulfonamido)-4-methylpyrimidine*

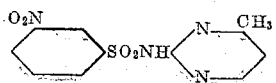

45 parts of m-nitrobenzenesulfonyl chloride and 22 parts of 2-amino-4-methylpyrimidine were mixed with 50 cc. of pyridine and the reaction mixture was allowed to stand for 15 hours at room temperature. It was then poured into 400 parts of water containing 150 parts of hydrochloric acid and the precipitated nitro compound was filtered. The 2-(m-nitrobenzenesulfonamido)-4-methylpyrimidine was purified by solution in alkali and treatment with charcoal. The melting point was 227°–229° C.

EXAMPLE 8

*2-metanilamido-4-methylpyrimidine*

A mixture of 46 parts of the nitro compound prepared in Example 7 and 100 parts of 1:1 ammonia was saturated with hydrogen sulfide with cooling. The orange solution was then boiled until a solid separated. After cooling this was acidified with acetic acid and filtered. The collected 2-metanilamido-4-methylpyrimidine was purified by solution in alkali, filtration, and reprecipitation with acid after treatment with charcoal. Further purification was effected by treatment with charcoal in acid solution. The melting point was 210°–213° C.

EXAMPLE 9

*2-(m-nitrobenzenesulfonamido)-4,6-dimethylpyrimidine*

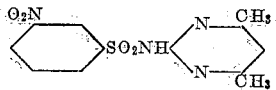

22 parts of m-nitrobenzenesulfonyl chloride and 20 parts of 2-amino-4,6-dimethylpyrimidine were mixed with 50 parts of pyridine and kept at room temperature for 18 hours. The thick solution was poured into 500 parts of water containing 100 parts of hydrochloric acid. The precipitated 2-(m-nitrobenzenesulfonamido)-4,6-dimethylpyrimidine was collected and purified by treatment with charcoal in alkaline solution.

EXAMPLE 10

*2-metanilamido-4,6-dimethylpyrimidine*

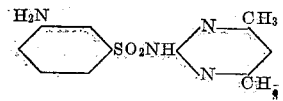

50 parts of the nitro compound prepared in Example 9 were suspended in 250 parts of 1:1 ammonia and this suspension was saturated with hydrogen sulfide. The resulting solution was boiled until a solid had separated and then cooled and acidified. The 2-metanilamido-4,6-dimethylpyrimidine was collected and purified by treatment with charcoal in alkaline solution.

EXAMPLE 11

*2-(m-nitrobenzenesulfonamido)-4-ethoxypyrimidine*

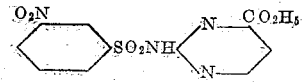

22 parts of m-nitrobenzenesulfonyl chloride and 23 parts of 2-amino-4-ethoxypyrimidine were mixed with 60 parts of pyridine. The mixture was heated on the steam bath for 15 minutes and then allowed to stand for one hour. The resulting solution was then poured into 600 parts of water containing 100 parts of hydrochloric acid. The precipitated 2-(m-nitrobenzenesulfonamido)-4-ethoxypyrimidine was collected and purified by treatment with charcoal in alkaline solution followed by precipitation with acid.

EXAMPLE 12

*2-metanilamido-4-ethoxypyrimidine*

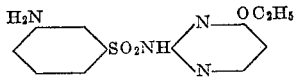

50 parts of the nitro compound from Example 11 were suspended in 250 parts of 1:1 ammonia and the mixture was saturated with hydrogen sulfide in the cold. The resulting solution was boiled until a solid separated and it was then cooled and acidified. The precipitated 2-metanilamido-4-ethoxypyrimidine was collected and purified by treatment with charcoal in alkaline solution.

EXAMPLE 13

*2-(m-nitrobenzenesulfonamido)-4-aminopyrimidine*

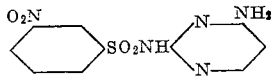

22 parts of m-nitrobenzenesulfonyl chloride and 18 parts of 2,4-diaminopyrimidine were mixed with 50 parts of pyridine and warmed at 50° C. for four hours. The resulting mixture was poured into 500 parts of water containing 75 parts of hydrochloric acid. The precipitate was collected and the 2-(m-nitrobenzenesulfonamido)-4-aminopyrimidine was purified by solution in alkali filtration, treatment with charcoal, and precipitation with acid.

EXAMPLE 14

*2-metanilamido-4-aminopyrimidine*

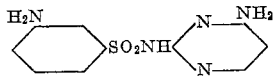

50 parts of the nitro compound prepared in Example 13 were suspended in 200 parts of 1:1 ammonium hydroxide and the mixture was saturated with hydrogen sulfide. The resulting solution was boiled until a solid separated and was then cooled and acidified. The precipitated 2-metanilamido-4-aminopyrimidine was collected and purified by solution in alkali, filtration, and treatment of the filtrate with charcoal.

EXAMPLE 15

*2-(m-nitrobenzenesulfonamido)-4-amino-5-bromopyrimidine*

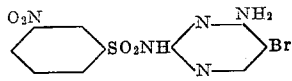

22 parts of m-nitrobenzenesulfonyl chloride and 30 parts of 2,4-diamino-5-bromopyrimidine (prepared by the bromination of 2,4-diaminopyrimidine in acid solution) were mixed with 75 parts of pyridine, and the mixture was heated on the steam bath for one hour. The resulting solution was poured into 500 parts of water containing 75 parts of hydrochloric acid, and the precipitate was filtered. The 2-(m-nitrobenzenesulfonamido)-4-amino-5-bromopyrimidine was purified by solution in alkali, filtration, and treatment with charcoal followed by precipitation with acid.

EXAMPLE 16

*2-metanilamido-4-amino-5-bromopyrimidine*

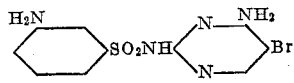

50 parts of the nitro compound prepared in Example 15 were suspended in 200 parts of 1:1 ammonia and the mixture was saturated with hydrogen sulfide. The resulting solution was boiled until a precipitate formed and was then cooled and acidified. The precipitated 2-metanilamido-4-amino-5-bromopyrimidine was collected and purified by treatment in alkaline solution with charcoal, followed by precipitation with acid.

EXAMPLE 17

*2-(m-nitrobenzenesulfonamido)-4-phenylpyrimidine*

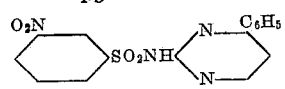

22 parts of m-nitrobenzenesulfonyl chloride and 35 parts of 2-amino-4-phenylpyrimidine were mixed with 75 parts of pyridine and heated on the steam bath for one hour. The resulting solution was poured into 500 cc. of water containing 75 parts of hydrochloric acid. The precipitated 2-(m-nitrobenzenesulfonamido)-4-phenylpyrimidine was collected and purified by solution in alkali, filtration, treatment of the alkaline filtrate with charcoal, and precipitation of the clarified solution with acid.

EXAMPLE 18

*2-metanilamido-4-phenylpyrimidine*

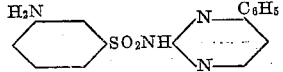

50 parts of the nitro compound prepared in Example 17 were suspended in 250 parts of 1:1 ammonia and the suspension was saturated with hydrogen sulfide. The resulting solution was boiled until a solid separated and was then cooled and acidified. The precipitated 2-metanilamido-4-phenylpyrimidine was collected and purified by treatment in alkaline solution with charcoal.

EXAMPLE 19

*2(m-nitrobenzenesulfonamido)-5-carbethoxypyrimidine*

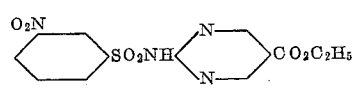

22 parts of m-nitrobenzenesulfonyl chloride and 25 parts of 2-amino-5-carbethoxypyrimidine (prepared by the reaction of guanidine with carbethoxymalondialdehydeacetal) were mixed with 50 parts of pyridine and heated at 60° C. for two hours. The resulting solution was poured into 500 parts of water containing 75 parts of hydrochloric acid and the precipitated 2-(m-nitrobenzenesulfonamido)-5-carbethoxypyrimidine was collected and purified by treatment in cold alkaline solution with charcoal.

EXAMPLE 20

*2-metanilamido-5-carbethoxypyrimidine*

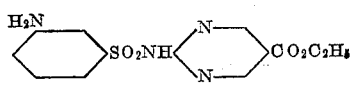

To a slurry prepared by heating 60 parts of iron powder with 200 parts of 5% acetic acid was added with stirring 50 parts of the nitro compound prepared in Example 17. The mixture was heated and stirred on the steam bath until it became completely black after passing through an intermediate yellow stage. The slurry was cooled and made alkaline with sodium carbonate. The mixture was filtered and 2-methanilamido-5-carbethoxypyrimidine was precipitated from the filtrate, after treatment with charcoal, by acidification. Further purification was obtained by redissolving in cold alkali and treatment of this solution with charcoal, followed by precipitation with acid.

In this example reduction of the meta nitro group was accomplished by means of hydrogen formed as the result of the action of an acid on a metal.

EXAMPLE 21

*2-metanilamido-5-carboxypyrimidine*

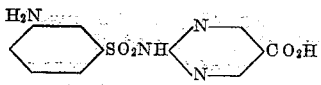

50 parts of 2-metanilamido-5-carbethoxypyrimidine, as prepared in Example 18, was dissolved in 200 parts of water containing 20 parts of sodium hydroxide and the resulting solution was refluxed for one hour. 2-metanilamido-5-carboxypyrimidine was precipitated at the end of this time by acidification. Further purification was obtained by treatment of its alkaline solution with charcoal.

EXAMPLE 22

*4-(m-nitrobenzenesulfonamido)pyrimidine*

22 parts of m-nitrobenzenesulfonyl chloride and 14 parts of 4-aminopyrimidine were mixed with 25 parts of pyridine and the mixture was allowed to stand for 18 hours. After this time it was poured into 500 parts of water containing 75 parts of concentrated hydrochloric acid. The precipitated 4-(m-nitrobenzenesulfonamido)pyrimidine was collected and purified by solution in alkali, filtration, treatment of the alkaline filtrate with charcoal, and precipitation with acid. It will be noted that in this example 4-aminopyrimidine is used in place of the 2-aminopyrimidine of the previous examples.

EXAMPLE 23

*4-metanilamidopyrimidine*

50 parts of 4-(m-nitrobenzenesulfonamido)pyrimidine, as prepared in Example 22, were suspended in 200 parts of 1:1 ammonia and the mixture was saturated with hydrogen sulfide with cooling. The resulting solution was boiled until a solid formed and was then cooled and acidified. The precipitated 4-metanilamidopyrimidine was purified by solution in alkali, filtration, and treatment of the alkaline filtrate with charcoal, followed by precipitation with acid.

EXAMPLE 24

*5-(m-nitrobenzenesulfonamido)pyrimidine*

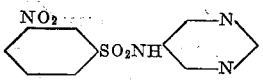

22 parts of m-nitrobenzenesulfonyl chloride and 14 parts of 5-aminopyrimidine were mixed with 50 cc. of pyridine, and the mixture was heated on the steam bath for 15 minutes. The resulting solution was then poured into 500 parts of water containing 75 parts of hydrochloric acid. The precipitated 5-(m-nitrobenzenesulfonamido)pyrimidine was collected and purified by solution in alkali, followed by treatment of its alkaline solution with charcoal. The diazine used in this example was 5-aminopyrimidine.

EXAMPLE 25

*5-metanilamidopyrimidine*

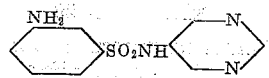

50 parts of 5-(m-nitrobenzenesulfonamido)pyrimidine from Example 24 was suspended in 200 parts of 1:1 ammonia and the suspension was saturated with hydrogen sulfide. The resulting solution was boiled until a solid precipitated and was then cooled and acidified. The precipitated 5-metanilamidopyrimidine was purified by solution in alkali, filtration, treatment of the alkaline filtrate with charcoal, and precipitation with acid.

EXAMPLE 26

*2-metanilamidopyrazine*

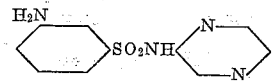

41 parts of chloropyrazine, 62 parts of metanilamide and 55 parts of anhydrous potassium carbonate were heated at 160°–180° C. for five hours with stirring and refluxing. The mixture was then cooled and dissolved in about 400 parts of water. This solution was steam distilled to remove the unreacted chloropyrazine. Unreacted metanilamide was precipitated by adjustment of the pH to 7.5–8 and it was filtered. The filtrate was acidified with an excess of acetic acid to precipitate the 2-metanilamidopyrazine. This was collected and further purified by treatment in acid and alkaline solution with charcoal. The melting point was 228°–230° C. Chloropyrazine was used as the diazine in this example. Preparation of this compound is described in the copending application of Philip S. Winnek, Serial No. 499,993, filed August 25, 1943, now Patent No. 2,396,066. It will also be noted that chloropyrazine is reacted directly with metanilamide, thus avoiding the use of a sulfonyl chloride.

EXAMPLE 27

*3-(m-nitrobenzenesulfonamido)pyridazine*

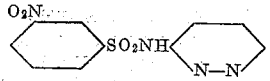

22 parts of m-nitrobenzenesulfonyl chloride and 14 parts of 3-aminopyridazine were mixed with 50 parts of pyridine and the mixture was allowed to stand at room temperature for 18 hours. The resulting solution was poured into 500 parts of water containing 75 parts of hydrochloric acid. The precipitated 3-(m-nitrobenzenesulfonamido)pyridazine was collected and purified by treatment of its alkaline solution with charcoal. In this example 3-aminopyridazine was used as the diazine, the reaction being conducted at room temperature as in Example 7.

EXAMPLE 28

*3-metanilamidopyridazine*

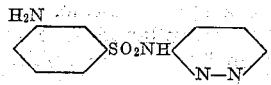

50 parts of 3-(m-nitrobenzenesulfonamido) pyridazine, as prepared in Example 27, were suspended in 200 parts of 1:1 ammonia and the suspension was saturated with hydrogen sulfide. The resulting solution was boiled until a solid precipitated and was then cooled and acidified. The separated 3-metanilamidopyridazine was purified by solution in alkali, filtration, and treatment of the alkaline filtrate with charcoal.

EXAMPLE 29

*5-(3-nitrobenzenesulfonamido)-2-chloropyrimidine*

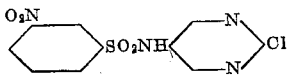

33 parts of 5-amino-2-chloropyrimidine were dissolved in 100 parts of anhydrous pyridine at 50°–60° C. 62 parts of m-nitrobenzenesulfonyl chloride were added to the solution at about 60° C. When the mixture had reached room temperature it was poured into 1000 parts of water and the mixture was neutralized. The 5-(3-nitrobenzenesulfonamido) - 2 - chloropyrimidine was collected and purified by treatment in alkaline solution with charcoal.

EXAMPLE 30

*5-metanilamido-2-chloropyrimidine*

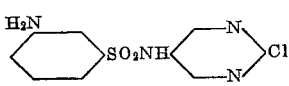

150 parts of iron dust were slurried with 300 parts of 2½% acetic acid. When the foaming had stopped 47.5 parts of 2-chloro-5-(3-nitrobenzenesulfonamido)pyrimidine were stirred in and the mixture was heated with stirring for one hour. It was then cooled, made basic, and filtered. The filtrate was clarified with charcoal and the 5-metanilamido-2-chloropyrimidine was precipitated by acidification with acetic acid.

EXAMPLE 31

*Sodium salt of 2-metanilamidopyrimidine*

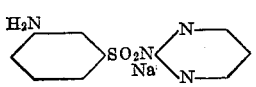

250 parts of 2-metanilamidopyrimidine were added to a refluxing solution of 46 parts of sodium in 4000 parts of absolute alcohol. When nearly all had been added a precipitate formed. The suspension was stirred and heated for one hour, cooled, and washed well with alcohol. The sodium salt of 2-metanilamidopyrimidine thus formed is very soluble in water. This example shows the preparation of salts of metanilamidodiazines. In this particular case X in the general formula is sodium.

EXAMPLE 32

*Purification of 2-metanilamido-5-chloropyrimidine*

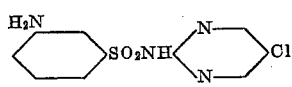

2-metanilamido-5-chloropyrimidine may be purified advantageously by preparing and recrystallizing the hydrochloride.

5 parts of 2-metanilamido-5-chloropyrimidine are dissolved in 70 parts of boiling water containing 3 parts of concentrated hydrochloric acid. The hot solution is treated with charcoal, filtered, and cooled. The precipitated hydrochloride is collected and transformed into the free compound with ammonia or sodium acetate.

EXAMPLE 33

*Sodium salt of 2-metanilamido-5-chloropyrimidine*

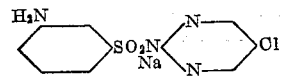

114 parts of 2-metanilamido-5-chloropyrimidine were dissolved in 80 parts of water and 41 parts of 10 N sodium hydroxide. The solution was diluted with 25 parts of absolute alcohol, treated with charcoal, and filtered. 950 parts of alcohol were added to the filtrate and the solution was chilled to precipitate the sodium salt. The precipitated hemihydrate of the sodium salt of 2-metanilamido-5-chloropyrimidine was collected and dried.

EXAMPLE 34

*2-(3-nitrobenzenesulfonamido)quinoxaline*

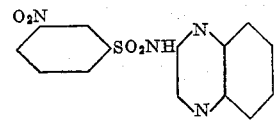

10 parts of 2-aminoquinoxaline (J.A.C.S. 66, 1958 (1944)) were suspended in 80 parts of anhydrous pyridine and to this was added 25 parts of m-nitrobenzenesulfonyl chloride. The whole was allowed to stand for 24 hours and then poured into 200 parts of water. The 2-(3-nitrobenzenesulfonamido)quinoxaline was filtered off and purified by dissolution in alkali, treatment with charcoal, and reprecipitation with acid. The substituted diazine, 2-aminoquinoxaline, is used as the intermediate in this example.

EXAMPLE 35

*2-metanilamidoquinoxaline*

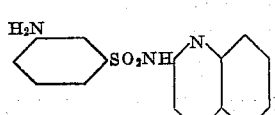

40 parts of 2 - (3 - nitrobenzenesulfonamido)-quinoxaline were dissolved in 250 parts of 1:1 aqueous ammonia. The mixture was saturated in the cold with hydrogen sulfide and concentrated to half volume over an open flame. The mixture was acidified and the solid filtered. The 2-metanilamidoquinoxaline was extracted with alkali and precipitated from the alkaline solution with acetic acid.

EXAMPLE 36

*2-(N³-acetylmetanilamido)pyrimidine*

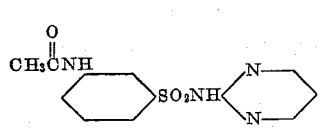

16 parts of 2-aminopyrimidine were suspended in 42 parts of anhydrous pyridine. 42 parts of acetylmetanilyl chloride were added with stirring in one hour at 40°–60° C. After the mixture had cooled somewhat it was poured into an equal volume of water and the precipitated 2-(N³-acetylmetanilamido)pyrimidine was filtered off. It could be purified by solution in alkali and reprecipitation.

EXAMPLE 37

2-metanilamidopyrimidine 30 parts of 2-(N³-acetylmetanilamido)pyrimidine were dissolved in 100 parts of water containing 10 parts of sodium hydroxide. The solution was boiled for one hour, clarified with Darco, and the 2-metanilamidopyrimidine was precipitated by acidification.

EXAMPLE 38

2-(3-nitrobenzenesulfonamido)pyrimidine

To 50 parts of 2-aminopyrimidine, dissolved in one liter of dry benzene, was added a solution of 50 parts of m-nitrobenzenesulfenyl chloride (Chem. Zentr. 34, II, 763) in one liter of dry benzene. The precipitate was filtered and the desired 2-(m - nitrobenzenesulfenamido) pyrimidine was extracted with hot acetone. The acetone was concentrated somewhat and the product was precipitated with water and oxidized.

25 parts of 2-(m-nitrobenzenesulfenamido)pyrimidine were suspended in 400 cc. of acetone and added to 500 cc. of 6% aqueous potassium permanganate containing 10 cc. of 10% sodium hydroxide. When the reaction was over, the suspension was filtered and the 2-(m-nitrobenzenesulfonamido)pyrimidine was precipitated from the filtrate by acidification.

This example illustrates another method of preparing the compounds of the preesnt invention. In this process an aminodiazine is reacted with a meta substituted benzenesulfenyl halide to form a benzenesulfenamido diazine which is then oxidized to the desired sulfonamido diazine.

EXAMPLE 39

2-(m-nitrobenzenesulfonamido)-5-chloropyrimidine 28 parts of m-nitrobenzenesulfonyl bromide (Beilstein, XI, 70) and 12 parts of 2-amino-5-chloropyrimidine (prepared by the chlorination of aminopyrimidine in acid solution) were mixed with 70 parts of pyridine and refluxed for two hours. This solution was poured into 400 parts of water containing 75 parts of hydrochloric acid. The separated solid was filtered. The 2-(m-nitrobenzenesulfonamido)-5-chloropyrimidine was purified by solution in alkali, filtration, and reprecipitation with acid after treatment with charcoal. The product melted at 234°–237° C.

This process utilizes a sulfonyl bromide in place of a sulfonyl chloride as shown in previous examples.

EXAMPLE 40

2-(m-nitrobenzenesulfonamido)pyrimidine 28 parts of m-nitrobenzenesulfonyl bromide and 14 parts of 2-aminopyrimidine were mixed with 25 parts of anhydrous pyridine and the reaction mixture was heated for 10 minutes on the steam bath, and after 30 minutes standing was poured into 700 parts of water. The 2-(m-nitrobenzenesulfonamido)pyrimidine was filtered off and dried. The product may be purified by solution in alkali, treatment with charcoal, filtration, and reprecipitation with acid. 19 parts melting at 217°–219° C. were obtained.

EXAMPLE 41

2-metanilamido-5-chloropyrimidine 60 parts of metanilamide were added to 150 parts of nitrobenzene and the mixture was heated to 140° C. To the resulting solution were added 40 parts of potassium carbonate and 60 parts of 2,5-dichloropyrimidine with vigorous stirring. The temperature was increased to 190° C. slowly and then lowered to, and maintained at, 160° C. for four hours. The nitrobenzene was steam distilled and the pH of the aqueous residue was adjusted to 8. After filtration, the solution was treated with charcoal, filtered, and the 2-metanilamido-5-chloropyrimidine was precipitated by acidification. This material could be further purified through its hydrochloride as described in Example 32. 53 parts, melting at 228°–230° C., were obtained. The direct reaction of metanilamide with a dichlordiazine is illustrated in the above example.

EXAMPLE 42

2-metanilamido-4,6-dimethylpyrimidine 107 parts of metanilylguanidine and 51 parts of acetylacetone were mixed and heated in an oil bath at 130° C. for 24 hours. The reaction mixture was cooled and the 2-metanilamido-4,6-dimethylpyrimidine was extracted with alkali. After filtration and treatment with charcoal it was precipitated by acidification. The melting point was 225–226.5° C. This example illustrates an unusual method of preparing compounds of the present invention by cyclization of the guanidine group by means of acetylacetone.

EXAMPLE 43

2-(m-nitrobenzenesulfonamido)-5-bromopyrimidine

A boiling solution of 32 parts of 2-(m-nitrobenzenesulfonamido)pyrimidine in 500 parts of acetic acid was treated with 27 parts of bromine in 250 parts of acetic acid. The solution was refluxed for 20 minutes, chilled, and the separated crystals filtered. The melting point of the product thus obtained was not depressed when mixed with a sample of 2-(m-nitrobenzenesulfonamido)-5-bromopyrimidine, prepared as described in Example 48.

The direct bromination of the diazine group in a meta-substituted benzene sulfonamidodiazine is shown above.

EXAMPLE 44

2-metanilamidopyrimidine

A solution of 34 parts of 2-benezenesulfonamidopyrimidine in a mixture of 100 parts of nitric acid (d:1.42) and 50 parts of 20% oleum was heated for 30 minutes at 40°–80° C. The product was poured into 1000 parts of water and made just alkaline with ammonium hydroxide and then acid with acetic acid. The solid which separated was filtered and dried.

75 parts of the material thus obtained were dissolved in a mixture of 200 parts of ammonium hydroxide (d:0.9) and 200 parts of water and the solution saturated with hydrogen sulfide gas. The mixture thus obtained was boiled for 10 minutes, made strongly acid with hydrochloric acid, treated with charcoal, and filtered. The filtrate was made alkaline with ammonium hydroxide and then acid with acetic acid. The solid which separated was filtered and dried. Its melting point was not depressed by 2-metanilamidopyrimidine, prepared as described in Example 2.

The nitration of a benzenesulfonamidodiazine to obtain a meta-nitrobenzenesulfonamidodiazine and subsequent reduction of the nitro group as a distinct method of preparing our new compounds is illustrated in this example.

EXAMPLE 45

*N¹-methyl-2-metanilamido-5-chloropyrimidine*

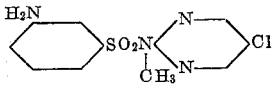

28.5 parts of finely powdered 2-metanilamido-5-chloropyrimidine is suspended in 125 parts of absolute ether and treated with 150 parts of ether containing about 4.2 parts of diazomethane. After about one hour the reaction mixture is treated with 600 parts of U. S. P. ether and filtered, after boiling for a few minutes.

N¹-methyl -2- metanilamido -5- chloropyrimidine is obtained by evaporation and melts at 130° C. after recrystallization from methanol.

The above example shows the preparation of compounds in which X in the general formula may be an alkyl radical.

EXAMPLE 46

*2-metanilamidopyrimidine*

10 parts of 2-aminopyrimidine and 10 parts of m-aminobenzenesulfonyl fluoride were mixed and heated for several hours at 150°–180° C. When the mixture was nearly solid it was cooled and boiled with 300–500 cc. of water and filtered. Upon cooling the filtrate, the crude 2-metanilamidopyrimidine separated and was purified by treatment of its alkaline solution with charcoal.

The use of sulfonyl fluorides in the direct coupling of a meta-aminobenzene sulfonyl group with a 2-aminodiazine is illustrated above.

EXAMPLE 47

*2-(3-nitrobenzenesulfonamido)-5-chloropyrimidine*

40 parts of m-nitrobenzenesulfonyl fluoride and 24 parts of 2-amino-5-chloropyrimidine were mixed with 150 parts of pyridine and refluxed for 4 hours. The solution was poured into 1000 parts of water and the separated 2-(3-nitrobenzenesulfonamido) - 5 - chloropyrimidine was filtered off and purified by treatment of its alkaline solution with charcoal.

EXAMPLE 48

*2-(3-nitrobenzenesulfonamido)-5-bromopyrimidine*

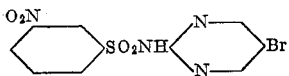

50 parts of 2-amino-5-bromopyrimidine and 70 parts of m-nitrobenzenesulfonyl chloride were added to 210 parts of pyridine and the whole was refluxed for two hours. The reaction mixture was poured into 1000 parts of 1:4 hydrochloric acid and the 2-(3-nitrobenzenesulfonamido)-5-bromopyrimidine was filtered off. It was purified by treatment of its alkaline solution with charcoal. 50 parts, melting point 243°–245° C., were obtained. It could also be crystallized from acetic acid which raised the melting point to 245°–247° C.

EXAMPLE 49

*2-metanilamido-5-bromopyrimidine*

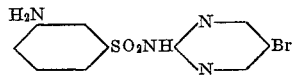

46 parts of 2-(3-nitrobenzenesulfonamido)-5-bromopyrimidine were added to 200 parts of 1:1 ammonia and the mixture was saturated with hydrogen sulfide gas. The mixture was then boiled, cooled, and made acid. The solid was filtered and dissolved in alkali. This solution was clarified with charcoal and the 2-metanilamido-5-bromopyrimidine was collected. It was purified by crystallization of its hydrochloride from dilute (1:20) hydrochloric acid and conversion of the salt to the free compound. 26 parts were obtained, the melting point being 238.5°–240° C.

EXAMPLE 50

*2-benzenesulfonamido-5-bromopyrimidine*

A solution of 4.7 parts of 2-benzenesulfonamidopyrimidine (English, Chappell, Bell and Roblin, J. Am. Chem. Soc. 64, 2516 (1942)) in 50 parts of boiling acetic acid was treated with a solution of 3.2 parts of bromine in 25 parts of acetic acid. The mixture was refluxed for 2 hours, cooled, and the separated solid filtered. This product was dissolved in dilute ammonium hydroxide solution, treated with charcoal, and reprecipitated with acetic acid. The melting point was 239°–241° C.

EXAMPLE 51

*2-metanilamido-5-bromopyrimidine*

A solution of 16 parts of 2-benzenesulfonamido-5-bromopyrimidine (Example 50) in a mixture of 33 parts of 20% oleum and 67 parts of ordinary nitric acid (d:1.42) was heated for an hour at 50°–75° C. and then poured into 1000 parts of water. The solid which separated was filtered and dissolved in 250 parts of ammonium sulfide solution. The resulting solution was boiled until a precipitate was obtained. The mixture was then made strongly acid with hydrochloric acid and filtered hot. The filtrate was made alkaline with ammonium hydroxide, treated with charcoal, filtered, and the filtrate made acid with acetic acid. The solid which separated was filtered and dried. Its melting point was not depressed when mixed with an authentic sample of 2-metanilamido-5-bromopyrimidine (Example 49).

This example, with Example 50, shows the direct bromination of the diazine group of a 2-benzenesulfonamidodiazine, the subsequent nitration of the benzene ring and the reduction of the meta-nitro radical to a meta-amino radical.

EXAMPLE 52

*2,5-dichloropyrimidine*

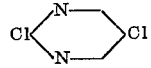

128 parts of 2-hydroxy-5-chloropyrimidine were mixed with 500 parts of POCl₃ and refluxed one hour. 400 parts of POCl₃ were distilled and the residue was worked up with ice and water. The aqueous mixture was neutralized with about 300 parts of sodium carbonate. The resulting 2,5-dichloropyrimidine may be steam distilled directly from the neutralized mixture or may be extracted

EXAMPLE 53

*2-hydroxy-5-chloropyrimidine*

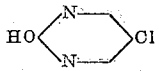

20 parts of 2-amino-5-chloropyrimidine were added slowly to a hot mixture of 20 parts of concentrated sulfuric acid and 80 parts of water. The mixture was cooled to 0° C. with stirring. The sulfate of the amine separated as a magma of small crystals. With stirring, keeping the temperature below 10° C., 10.7 parts of sodium nitrite dissolved in 30 parts of water were added in the course of ninety minutes. The mixture was stirred for an additional hour and left at room temperature overnight. The mixture was then warmed on a steam bath and 70 parts of concentrated ammonium hydroxide gradually added. On cooling the ammonium salt of 2-hydroxy-5-chloropyrimidine crystallized out. It was filtered and dissolved in 80 parts of hot water. On acidification of the hot solution with 11 parts of glacial acetic acid the desired product was precipitated. After filtering and washing with water, 12.8 parts of 2-hydroxy-5-chloropyrimidine were obtained. Melting point was 237°–238° C. with decomposition. The decomposition point is variable depending on the rate of heating.

EXAMPLE 54

*m-Nitrobenzenesulfonylguanidine*

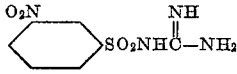

120 parts of guanidine nitrate were suspended in 700 parts of acetone and treated with 150 parts of 10 N sodium hydroxide. The mixture was stirred and cooled to 10° C. and treated with 111 parts of m-nitrobenzenesulfonyl chloride in three portions. When the reaction was over, 1000 parts of water were added and the precipitated crude m-nitrobenzenesulfonylguanidine was filtered off. It was purified by leaching with dilute alkali and crystallization from aqueous isopropanol (1:1). Melting point was 198°–200° C.

EXAMPLE 55

*Metanilylguanidine*

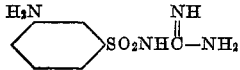

33 parts of m-nitrobenzenesulfonylguanidine from Example 54 were suspended in 2000 parts of alcohol and reduced with hydrogen at 50 pounds pressure in the presence of Raney nickel catalyst. The solution was warmed and filtered from the catalyst. The filtrate was cooled to give metanilylguanidine. Further crops could be collected by concentration of the filtrate. The melting point, after treatment with charcoal in acid solution, was 185.5°–189° C.

EXAMPLE 56

*2-(m-nitrobenzenesulfonamido)-5-bromo-4-methylpyrimidine*

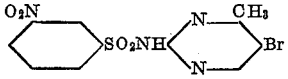

94 parts of 2-amino-5-bromo-4-methylpyrimidine were suspended in 150 parts of pyridine with 150 parts of m-nitrobenzenesulfonyl chloride. The mixture was left for sixteen hours at 40° C. and then poured into water. The dark precipitate of 2-(m-nitrobenzenesulfonamido)-5-bromo-4-methylpyrimidine was collected and purified by treatment in alkaline solution with charcoal and by crystallization from acetic acid.

EXAMPLE 57

*2-metanilamido-5-bromo-4-methylpyrimidine*

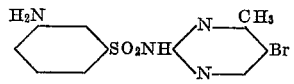

50 parts of 2-(m-nitrobenzenesulfonamido)-5-bromo-4-methylpyrimidine were suspended in 450 parts of 1:1 ammonia and the mixture was saturated with hydrogen sulfide. The resulting mixture was boiled to half volume and acidified with acetic acid. The precipitated crude 2-metanilamido-5-bromo-4-methylpyrimidine was collected and purified by treatment of its alkaline solution with charcoal and by crystallization of its hydrochloride, as described for 2-metanilamido-5-bromopyrimidine in Example 51, or for 2-metanilamido-5-chloropyrimidine in Example 32.

What we claim is:

1. A method of preparing 2-meta-aminobenzenesulfonamido-5-halopyrimidines which comprises mixing together and reacting a meta-nitrobenzenesulfonyl halide with 2-aminopyrimidine in the presence of a tertiary amine, treating the reaction product with a halogen, and thereafter reducing the meta-nitro group to an amino group.

2. A method of preparing 2-meta-aminobenzenesulfonamido-5-bromopyrimidine which comprises mixing together and reacting a meta-nitrobenzenesulfonyl halide with 2-aminopyrimidine in the presence of a tertiary amine, treating the reaction product with bromine, and thereafter reducing the meta-nitro group to an amino group.

3. A method of preparing 2-meta-aminobenzenesulfonamido-5-chloropyrimidine which comprises mixing together and reacting a meta-nitrobenzenesulfonyl halide with 2-aminopyrimidine in the presence of a tertiary amine, treating the reaction product with chlorine, and thereafter reducing the meta-nitro group to an amino group.

4. A method of preparing 2-meta-aminobenzenesulfonamido-5-halopyrimidines which comprises the steps of treating 2-(meta-nitrobenzenesulfonamido)pyrimidine with a halogen and thereafter reducing the nitro group to an amino group.

5. 2-(meta-aminobenzenesulfonamido)-5-halopyrimidine.

6. 2-(meta-aminobenzenesulfonamido)-5-chloropyrimidine.

7. 2-(meta-aminobenzenesulfonamido)-5-bromopyrimidine.

JACKSON P. ENGLISH.
JOE H. CLARK.

REFERENCES CITED

The following references are of record in the file of this patent:

UNITED STATES PATENTS

| Number | Name | Date |
| --- | --- | --- |
| 1,898,431 | Dressel et al. | Feb. 21, 1933 |
| 2,299,555 | Mietzsch et al. | Oct. 20, 1942 |

(Other references on following page)

UNITED STATES PATENTS

| Number | Name | Date |
|---|---|---|
| 2,324,013 | Moore et al. | July 13, 1943 |
| 2,407,966 | Sprague | Sept. 17, 1946 |
| 2,410,793 | Winnek et al. | Nov. 5, 1946 |
| 2,423,108 | Moore | July 1, 1947 |

FOREIGN PATENTS

| Number | Country | Date |
|---|---|---|
| 114,821 | Australia | May 21, 1942 |
| 116,165 | Australia | Aug. 18, 1941 |
| 317,338 | Great Britain | Aug. 13, 1929 |

OTHER REFERENCES

Journal Amer. Chem. Soc., August 1940, pages 2002–2005.

Cogshill, Jour. Am. Med. Assn. 117, 1077–1081 (1941).

J.A.C.S., vol. 63, page 2182 (1941).